(12) United States Patent
Yokonuma

(10) Patent No.: US 10,527,876 B2
(45) Date of Patent: Jan. 7, 2020

(54) LIQUID CRYSTAL DISPLAY DEVICE

(71) Applicant: Panasonic Liquid Crystal Display Co., Ltd., Hyogo (JP)

(72) Inventor: Shinsuke Yokonuma, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 58 days.

(21) Appl. No.: 15/939,248

(22) Filed: Mar. 28, 2018

(65) Prior Publication Data

US 2019/0302502 A1    Oct. 3, 2019

(51) Int. Cl.
| | | |
|---|---|---|
| G02F 1/133 | (2006.01) | |
| G02F 1/1343 | (2006.01) | |
| G02F 1/1335 | (2006.01) | |
| G09G 3/36 | (2006.01) | |
| G02F 1/1333 | (2006.01) | |
| G02F 1/1347 | (2006.01) | |

(52) U.S. Cl.
CPC ........ *G02F 1/13318* (2013.01); *G02F 1/1347* (2013.01); *G02F 1/13338* (2013.01); *G02F 1/13439* (2013.01); *G02F 1/133553* (2013.01); *G09G 3/36* (2013.01); *G02F 2001/13312* (2013.01); *G02F 2203/01* (2013.01); *G02F 2203/02* (2013.01); *G09G 2300/0456* (2013.01)

(58) Field of Classification Search
CPC .............. G09G 3/36; G09G 2300/0456; G02F 1/13318; G02F 1/13338; G02F 1/1347; G02F 1/133553; G02F 1/13439; G02F 2203/01; G02F 2203/02; G02F 2001/13312
See application file for complete search history.

(56) References Cited

U.S. PATENT DOCUMENTS

| | | | |
|---|---|---|---|
| 7,525,626 B2 | 4/2009 | Nagano | |
| 8,009,249 B2* | 8/2011 | Yoshihara | G02F 1/1347 349/77 |
| 8,451,201 B2 | 5/2013 | Hirata et al. | |
| 2008/0049005 A1* | 2/2008 | Okita | G09G 3/3648 345/207 |
| 2008/0123000 A1* | 5/2008 | Lin | G02F 1/133555 349/33 |
| 2009/0073150 A1* | 3/2009 | Shih | G02F 1/13338 345/207 |
| 2013/0021230 A1* | 1/2013 | Bergquist | G09G 3/3406 345/90 |

* cited by examiner

*Primary Examiner* — Brent D Castiaux
(74) *Attorney, Agent, or Firm* — HEA Law PLLC

(57) ABSTRACT

A liquid crystal display device including a liquid crystal display panel, a light source for providing backlight, and a controller for receiving an external input image signal is disclosed. The liquid crystal display panel includes transmittance pixels and reflective pixels therein. The controller independently controls and regulates the transmittance pixels and the reflective pixels to be either in an active state or in an inactive state based on an intensity of external light, such that the transmittance pixels transmit the backlight based on the external input image signal in the active state and block the backlight irrespective of the external input image signal in the inactive state; and the reflective pixels reflect external light based on the external input image signal in the active state and inhibit reflection of the external light irrespective of the external input image signal in the inactive state.

13 Claims, 5 Drawing Sheets

LIQUID CRYSTAL DISPLAY DEVICE

FIELD OF THE PRESENT DISCLOSURE

The present disclosure relates to a liquid crystal display device.

BACKGROUND

Liquid crystal displays (LCDs) provide a flat display in a relatively thin package that is suitable for use in a variety of electronic goods. LCDs are commonly used as screens or displays for a wide variety of electronic devices, including such consumer electronics as televisions, computers, and handheld devices (e.g., mobile phones, audio and video players, gaming systems, and so forth). Further, such LCD devices have also been utilized for digital signage, such as advertisement displays which are generally located outdoors. The LCD devices have become ubiquitous in modern times and are being increasingly installed in both indoor and outdoor environments. These LCD devices are expected to always generate a superior image quality irrespective of the lightning conditions, i.e., whether it is a bright sunny outdoor environment or a dark nightclub environment. Furthermore, these LCD devices are expected to be energy efficient, especially when used in portable handheld devices which are generally powered by batteries with limited energy capacity.

Typical liquid crystal display devices are transmission type, which include a light source, generally a backlight, disposed at the rear or one side thereof. The amount of the backlight from the light source which passes through the liquid crystal display panel is controlled in order to realize an image in the liquid crystal display device. Such transmission type liquid crystal display device is disadvantageous when the environment is bright. When the liquid crystal display device needs to be viewed at a position exposed to direct sunlight or direct illumination light, the display quality is inevitably lower due to the ambient light. That is, the color reproducibility is lower and the display is not sufficiently recognizable because the display light is less bright than the ambient light. For example, when a liquid crystal display device receives direct sunlight or illumination light, surrounding images are mirrored, making it difficult to observe the display itself. In order to improve the display quality under a bright environment, the intensity of the backlight from the light source needs to be increased. This increases the power consumption of the light source and thus the overall power consumption of the liquid crystal display device.

In some cases, reflection type liquid crystal display devices have been used for displays which are often used outdoors. Usually, such a reflection type liquid crystal display device is provided with a reflector formed on one of a pair of substrates in place of the backlight so that ambient light is reflected from the surface of the reflector. However, the reflection type liquid crystal display device using the reflection of ambient light is disadvantageous in that the visibility of the display is generally very low when the surrounding environment is dark, because of the lack of the ambient light to reflect back.

Some known liquid crystal display devices utilize a construction which realizes both transmission of back light as well as reflection of external light for displaying an image. For example, U.S. Pat. No. 7,525,626 discloses a transflective liquid crystal display having a reflector region and a transparent region in one pixel. The said transflective liquid crystal display is able to display using both the light from the backside light source and surrounding light from outside. The transflective liquid crystal display simultaneously uses backside light source and surrounding outside light, as the light sources. Specifically, in a bright place, the surrounding outside light is reflected by the reflector region that is provided in a pixel to a visible side in order to boost brightness for displaying an image.

However, the known liquid crystal display devices utilizing such trans-reflective pixels do not provide any means for controlling transmission regions and reflection regions of the pixels independent to each other. Accordingly, there are no suitable means to regulate such liquid crystal display devices for varying intensity levels of external light to deliver a calibrated image with appropriate brightness each time. The present invention has been made in view of such considerations, and it is an object of the present invention to improve the display quality of such liquid crystal display device.

SUMMARY

In an aspect, a liquid crystal display device is disclosed. The liquid crystal display device comprises a liquid crystal display panel. The liquid crystal display device also comprises a light source for providing backlight for the liquid crystal display panel. The liquid crystal display device further comprises a controller for receiving an external input image signal and controlling the liquid crystal display panel. In the liquid crystal display device, the liquid crystal display panel comprises a plurality of transmittance pixels and a plurality of reflective pixels formed thereon. Further, in the liquid crystal display device, the controller is configured to control each of the plurality of transmittance pixels and each of the plurality of reflective pixels to be either in an active state or in an inactive state independent to each other. Further, in the liquid crystal display device, the controller is configured to control each of the plurality of transmittance pixels in the active state to transmit the backlight from the light source based on the external input image signal, and is further configured to control each of the plurality of transmittance pixels in the inactive state to block the backlight from the light source irrespective of the external input image signal, and is further configured to control each of the plurality of reflective pixels in the active state to reflect external light based on the external input image signal, and is further configured to control each of the plurality of reflective pixels in the inactive state to inhibit reflection of external light irrespective of the external input image signal. Further, in the liquid crystal display device, the controller is configured to regulate each of the plurality of transmittance pixels either in the active state or in the inactive state, and to regulate each of the plurality of reflective pixels either in the active state or in the inactive state.

In one or more embodiments, the liquid crystal display device further comprises at least one light sensor configured to measure an intensity of external light impinging on the liquid crystal display device and generate an intensity signal indicative of the intensity of external light.

In one or more embodiments, the controller is configured to regulate a number of the plurality of transmittance pixels either in the active state or in the inactive state based on the intensity signal, and to regulate a number of the plurality of reflective pixels either in the active state or in the inactive state based on the intensity signal.

In one or more embodiments, the controller is configured to regulate a first number of the plurality of reflective pixels to be in an inactive state when the intensity signal is at a first level. The controller is configured to regulate a second number of the plurality of reflective pixels to be in an inactive state when the intensity signal is at a second level. The second level is darker than the first level. The second number of the plurality of reflective pixels is larger than the first number of the plurality of reflective pixels.

In one or more embodiments, the controller is configured to regulate all of the plurality of reflective pixels in the inactive state when the intensity signal indicative of the intensity of external light is darker than a second level. The second level is darker than the first level.

In one or more embodiments, the controller is configured to regulate a fourth number of the plurality of transmittance pixels to be in the inactive state when the intensity signal is at a fourth level. The controller is configured to regulate a fifth number of the plurality of transmittance pixels to be in the inactive state when the intensity signal is at a fifth level. The fifth level is brighter than the fourth level, and the fifth number of the plurality of transmittance pixels is larger than the fourth number of the plurality of transmittance pixels.

In one or more embodiments, in case of the intensity signal indicative of the intensity of external light being brighter than a fourth level, the fourth level being brighter than the third level, the controller is configured to regulate all of the plurality of transmittance pixels in the inactive state.

In one or more embodiments, the light source is switched off when the intensity signal indicative of the intensity of external light is brighter than the fourth level.

In one or more embodiments, the controller is configured to regulate all of the plurality of transmittance pixels and all of the plurality of reflective pixels in the active state when the intensity signal indicative of the intensity of external light is brighter than a first level and darker than a third level.

In one or more embodiments, a number of the plurality of transmittance pixels is equal to number of the plurality of reflective pixels.

In one or more embodiments, the liquid crystal display device further comprises two or more light sensors. Each of the two or more light sensors associated with a unique section of the liquid crystal display device and configured to measure an intensity of external light impinging on the unique section of the associated section and generate a section intensity signal indicative of the intensity of external light.

In one or more embodiments, the controller is configured to regulate a number of the plurality of transmittance pixels either in the active state or in the inactive state in the one or more sections based on the section intensity signals corresponding thereto, and to regulate a number of the plurality of reflective pixels either in the active state or in the inactive state in the one or more sections based on the section intensity signals corresponding thereto.

In one or more embodiments, the controller is configured to allow for manually regulating the number of the plurality of transmittance pixels and the number of the plurality of reflective pixels either in the active state or in the inactive state.

In one or more embodiments, the liquid crystal display device further comprises an additional liquid crystal display panel stacked on the liquid crystal display panel such that the liquid crystal display panel is between the light source and the additional liquid crystal display panel. Each pixel formed in the additional liquid crystal display panel is a transmittance pixel.

In another aspect, a liquid crystal display device is disclosed. The liquid crystal display device comprises a plurality of liquid crystal display panels including a first liquid crystal display panel and a second liquid crystal display panel. The liquid crystal display device also comprises a light source for providing backlight for the plurality of liquid crystal display panels. The liquid crystal display device further comprises a controller for receiving an external input image signal and controlling the plurality of liquid crystal display panels. In the liquid crystal display device, the first liquid crystal display panel is disposed between the second liquid crystal display panel and the light source. Further, in the liquid crystal display device, the first liquid crystal display panel comprises a plurality of transmittance pixels and a plurality of reflective pixels formed thereon. Further, in the liquid crystal display device, the controller is configured to control the plurality of transmittance pixels and the plurality of reflective pixels to be either in an active state or in an inactive state independent to each other. Further, in the liquid crystal display device, the controller is configured to control each of the plurality of transmittance pixels in the active state to transmit the backlight from the light source irrespective of the external input image signal, and is further configured to control each of the plurality of transmittance pixels in the inactive state to block the backlight from the light source irrespective of the external input image signal, and is further configured to control each of the plurality of reflective pixels in the active state to reflect external light irrespective of the external input image signal, and is further configured to control each of the plurality of reflective pixels in the inactive state to inhibit reflection of external light irrespective of the external input image signal. Further, in the liquid crystal display device, the controller is configured to regulate each of the plurality of transmittance pixels either in the active state or in the inactive state, and to regulate each of the plurality of reflective pixels either in the active state or in the inactive state.

In one or more embodiments, each pixel formed in the second liquid crystal display panel is a transmittance pixel and the controller is configured to regulate each of a plurality of transmittance pixels in the second liquid crystal display panel in the active state to transmit the backlight from the light source based on the external input image signal.

In one or more embodiments, the liquid crystal display device further comprises at least one light sensor configured to measure an intensity of external light impinging on the liquid crystal display device and generate an intensity signal indicative of the intensity of external light.

In one or more embodiments, the controller is configured to regulate a number of the plurality of transmittance pixels of the first liquid crystal display panel either in the active state or in the inactive state based on the intensity signal, and to regulate a number of the plurality of reflective pixels of the first liquid crystal display panel either in the active state or in the inactive state based on the intensity signal.

In one or more embodiments, the controller is configured to regulate a first number of the plurality of reflective pixels in the inactive state when the intensity signal is at a first level. And the controller is configured to regulate a second number of the plurality of reflective pixels in the inactive state when the intensity signal is at a second level. The second level is darker than the first level. And the second number of the plurality of reflective pixels is larger than the first number of the plurality of reflective pixels.

In one or more embodiments, the controller is configured to regulate a fourth number of the plurality of transmittance pixels in the inactive state when the intensity signal is at a fourth level. And the controller is configured to regulate a fifth number of the plurality of transmittance pixels in the inactive state when the intensity signal is at a fifth level. The fifth level is brighter than the fourth level. And the fifth number of the plurality of transmittance pixels is larger than the fourth number of the plurality of transmittance pixels.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

Figure 1:
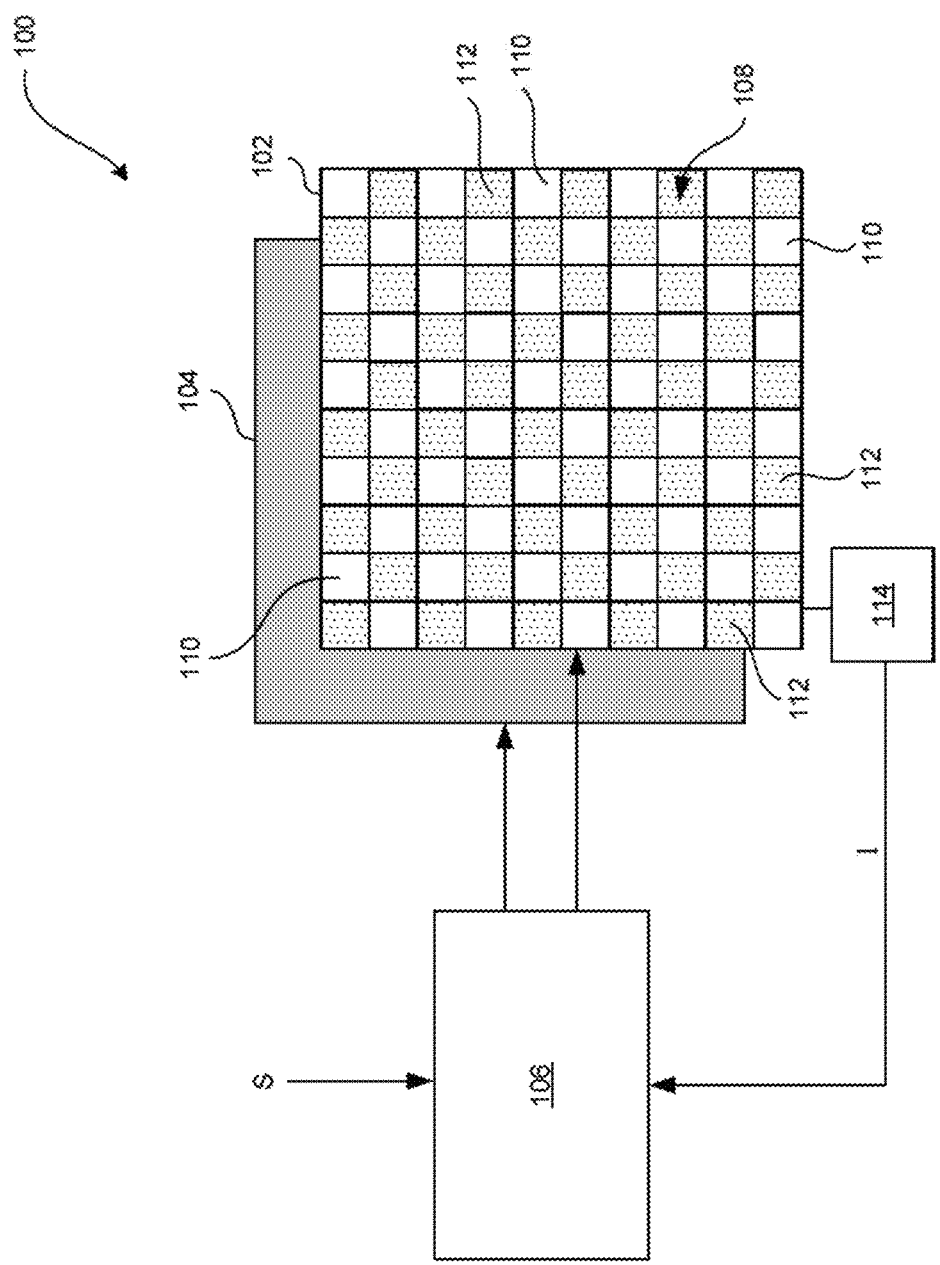
FIG. 1 illustrates a schematic representation of a liquid crystal display device, in accordance with one embodiment of the present disclosure.

FIG. 1 illustrates a schematic configuration of a liquid crystal display device (generally referenced by the numeral 100), in accordance with an embodiment of the present disclosure. The liquid crystal display device 100 includes a liquid crystal display panel 102 that displays an image therein. The liquid crystal display device 100 also includes a light source 104 for providing backlight for the liquid crystal display panel 102. Generally, the light source 104 is arranged on a rear surface side of the liquid crystal display panel 102 to irradiate the liquid crystal display panel 102 with the backlight. In the liquid crystal display device 100, the liquid crystal display panel 102 is driven by a controller 106. The controller 106 is configured for receiving an external input image signal (designated by label 'S' in the drawings, and hereinafter simply referred to as image signal 'S'). The image signal 'S' may be a video source or a display signal based on it. It may be contemplated that the image signal 'S' refers not only to video signals from a TV receiver, VTR, or DVD player, but also to those produced by processing these signals. The controller 106 is further configured for controlling the liquid crystal display panel 102 for outputting images based, at least in part, on the image signal 'S'. In general, the image signal 'S' and the output images have a one-to-one relationship. In one or more examples, the controller 106 is further configured to control the light source 104, for example, to control the electric energy supplied to the light source 104 to vary the intensity of backlight emitted therefrom, as well as to switch on/off the light source 104 if required.

As schematically illustrated in FIG. 1, the liquid crystal display panel 102 includes a plurality of pixels 108 therein. In one or more examples, the controller 106 may be a driving circuit, including a gate line driving circuit and a data line driving circuit, which may be disposed in or outside of the liquid crystal display panel 102. The liquid crystal display panel 102 may include a plurality of gate lines and a plurality of data lines which are connected to the gate line driving circuit and the data line driving circuit, respectively. In the liquid crystal display device 100, the pixels 108 are formed between any of the two adjacent gate lines and two adjacent data lines therein. It may be understood that the pixels 108 may be independently controlled by controlling voltages in the corresponding gate lines and data lines by the controller 106, or specifically the gate line driving circuit and the data line driving circuit in the controller 106. Such configuration for a liquid crystal display device is very well known in the art, and thus has not been described herein or illustrated in the associated drawings for the brevity of the present disclosure.

According to an embodiment of the present disclosure, the plurality of pixels 108, in the liquid crystal display panel 102, includes a plurality of transmittance pixels 110 and a plurality of reflective pixels 112. For illustration purposes, the transmittance pixels 110 and the reflective pixels 112 have been shown using different hatch patterns in the drawings. It may be contemplated by a person skilled in the art that the transmittance pixels 110 may be formed by using optically transmissive pixel electrodes, e.g. made of ITO (Indium-Tin-Oxide alloy); and the reflective pixels 112 may be formed by using optically reflective pixel electrodes, e.g. made of reflective metallic material, such as, Aluminum (Al). The construction of such transmissive pixel electrodes and reflective pixel electrodes, and manufacturing methods thereof, are generally well known in the art and thus have not been described herein. However, in some of the present embodiments, each of the transmittance pixels 110 is formed of transmissive pixel electrodes (not including any reflective pixel electrodes therein) and each of the reflective pixels 112 is formed of reflective pixel electrodes (not including any transmissive pixel electrodes therein).

In a particular embodiment, a number of the plurality of transmittance pixels 110 is equal to number of the plurality of reflective pixels 112, in the liquid crystal display panel 102. That is, the transmittance pixels 110 and the reflective pixels 112 have one-to-one correspondence. However, it may be contemplated that, in other examples, the liquid crystal display panel 102 may have more number of transmittance pixels 110 relative to the reflective pixels 112, and vice-versa without affecting the scope of the present disclosure. It may be understood that, in the present examples, the liquid crystal display panel 102 includes one reflective pixel 112 between any two of the transmittance pixels 110 in each row and column direction; or in other words, one transmittance pixels 110 between any two of the reflective pixel 112 in each row and column direction. In the illustrations, the exemplary liquid crystal display panel 102 has been shown to include a total of hundred (100) number of pixels 108, with fifty (50) of them being the transmittance pixels 110 and other fifty (50) of them being the reflective pixels 112. It may be understood that the liquid crystal display panel 102 may be scaled up from this exemplary configuration using substantially similar proportions of the transmittance pixels 110 and the reflective pixels 112 therein. The pixel pattern of the transmittance pixels 110 and the reflective pixels 112 is not limited to the checkerboard pattern shown in FIG. 1, and could be applied to another pattern.

According to an embodiment of the present disclosure, the controller 106 is configured to control each of the plurality of transmittance pixels 110 and each of the plurality of reflective pixels 112 to be either in an active state or in an inactive state independent to each other. In general, the active state for any one of the transmittance pixels 110 implies that the said transmittance pixel 110 is configured to allow transmission of light therethrough; and the inactive state for any one of the transmittance pixels 110 implies that the said transmittance pixel 110 is configured to block transmission of light therethrough. Similarly, the active state for any one of the reflective pixels 112 implies that the reflective pixel 112 is configured to allow reflection of light therefrom; and the inactive state for any one of the reflective pixels 112 implies that the said reflective pixel 112 is configured to inhibit reflection of light therefrom. It may be understood that the controller 106 configures the pixels 110, 112 to be in the active state and the inactive state by controlling the generated electric field corresponding to each of the pixel 110, 112, and thereby controlling associated liquid crystal molecules to allow or block light through thereof. It may generally be contemplated that the transmittance pixel 110 and the reflective pixel 112 when in the active state may generally consume more electrical energy as compared to the same transmittance pixel 110 and the same reflective pixel 112 when in the inactive state.

Further, the controller 106 is configured to control each of the plurality of transmittance pixels 110 in the active state to transmit the backlight from the light source 104 based on the image signal 'S'. The controller 106 is also configured to control each of the plurality of transmittance pixels 110 in the inactive state to block the backlight from the light source 104 irrespective of the image signal 'S'. Further, the controller 106 is configured to control each of the plurality of reflective pixels 112 in the active state to reflect external light based on the image signal 'S'. The controller 106 is also configured to control each of the plurality of reflective pixels 112 in the inactive state to inhibit reflection of external light irrespective of the image signal 'S'. It may be understood that controller 106 may control the transmittance pixel 110 or the reflective pixel 112 in the active state in a conventional manner to display an image based on the image signal 'S'. Further, in case of the transmittance pixel 110 in the inactive state, the controller 106 may generally block any transmittance of the backlight therethrough; and in case of the reflective pixel 112 in the inactive state, the controller 106 may generally inhibit any reflection of the external light therefrom, irrespective of the image signal 'S'.

Furthermore, the controller 106 is configured to regulate each of the plurality of transmittance pixels 110 either in the active state or in the inactive state, and to regulate each of the plurality of reflective pixels 112 either in the active state or in the inactive state. In the present embodiments, the controller 106 is configured to regulate the transmittance pixels 110 and the reflective pixels 112 based on an intensity of the external light impinging on the liquid crystal display device 100. For this purpose, the liquid crystal display device 100 includes a light sensor 114 configured to measure the intensity of the external light impinging thereon. One or more light sensors may be used and positioned at different locations around the liquid crystal display device 100. The light sensor 114 is further configured to generate an intensity signal (designated by label 'I' in the drawings) indicative of the measured intensity of the external light. It may be understood that the intensity signal 'I' may generally represent a lightning condition of the external environment in which the liquid crystal display device 100 is located. A higher value of the intensity signal 'I' may represent a relatively brighter condition compared to a lower value of the intensity signal 'I' which may represent a relatively darker condition. In one or more examples, the light sensor 114 is a photoresistor. Photoresistors, also known as light detecting resistors (LDR), are typically made from cadmium sulfide (CdS) cells that are sensitive to visible and near infrared light. The resistance of a CdS cell varies inversely with the amount of light incident upon it; for example, bright light causes a low resistance between the two leads of the cell while low light results in a higher resistance. Thus, by measuring the change in resistance, proportional changes in light intensity can be measured.

Figure 2:
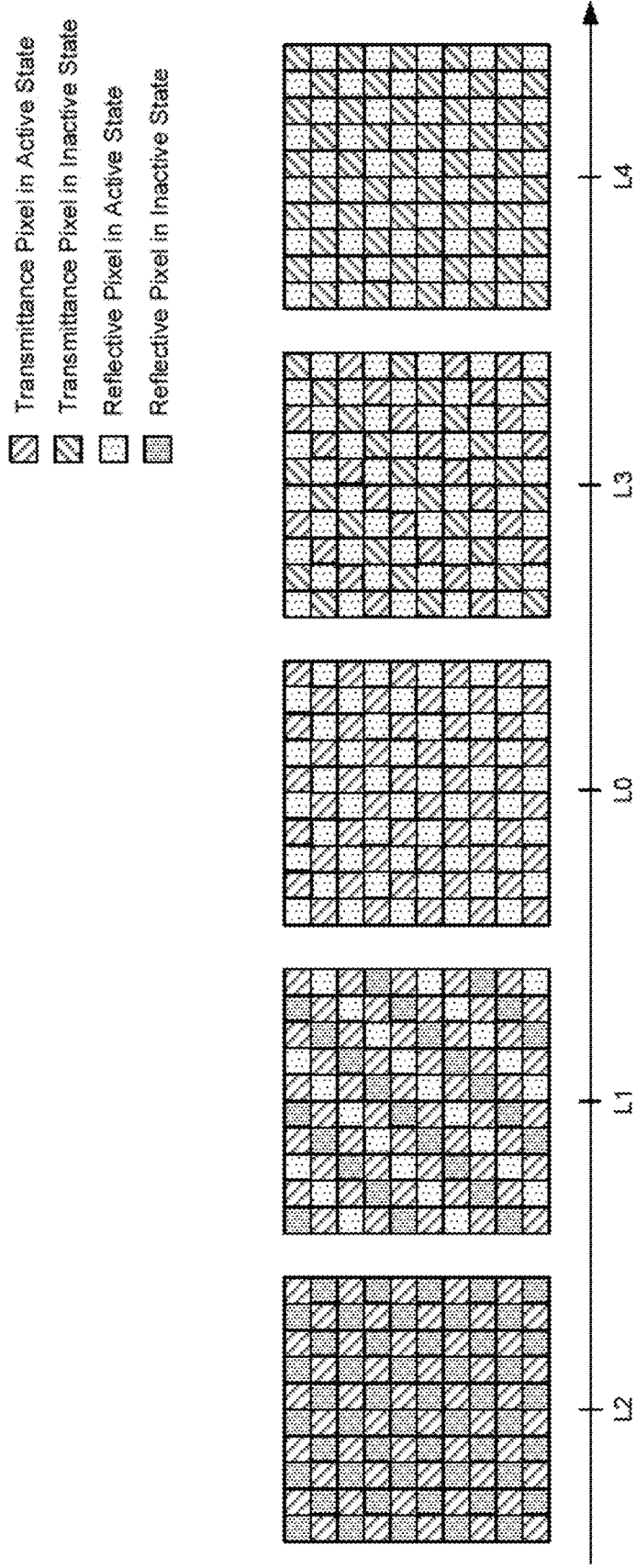
FIG. 2 illustrates a scale depicting states of transmittance pixels and reflective pixels in a liquid crystal display panel of the liquid crystal display device based on an intensity signal, in accordance with one example embodiment of the present disclosure.

Accordingly, the controller 106 is configured to regulate a number of the plurality of transmittance pixels 110 either in the active state or in the inactive state based on the intensity signal 'I'. Further, the controller 106 is configured to regulate a number of the plurality of reflective pixels 112 either in the active state or in the inactive state based on the intensity signal 'I'. FIG. 2 illustrates the different states of the transmittance pixels 110 and the reflective pixels 112 in the liquid crystal display panel 102 based on the varying intensity signal 'I'. As may be seen, FIG. 2 utilizes four different hatch patterns to represent the transmittance pixels 110 in the active state, the transmittance pixels 110 in the inactive state, the reflective pixels 112 in the active state, and the reflective pixels 112 in the inactive state, respectively. It may be understood that the illustrated positions of the transmittance pixels 110 and the reflective pixels 112 in the liquid crystal display panel 102 are exemplary only and shall not be construed as limiting to the present disclosure in any manner.

In the accompanied depiction of FIG. 2, it may be understood that the intensity signal 'I' is increasing along the right direction. A zero level (as indicated by 'L0') has been arbitrarily defined to represent normal lightning conditions of the external environment. In FIG. 2, a first level (as indicated by 'L1') represents darker condition of the external environment as compared to the zero level 'L0'. Similarly, a second level (as indicated by 'L2') represents darker condition of the external environment as compared to the first level 'L1', and a third level (as indicated by 'L3') represents darker condition of the external environment as compared to the second level 'L2'. Further in FIG. 2, a fourth level (as indicated by 'L4') represents brighter condition of the external environment as compared to the zero level 'L0'. Similarly, a fifth level (as indicated by 'L5') represents brighter condition of the external environment as compared to the fourth level 'L4', and a sixth level (as indicated by 'L6') represents brighter condition of the external environment as compared to the fifth level 'L5'. In the present examples where the zero level 'L0' may generally represent normal lightning condition, the first level 'L1' may generally represent a darker than normal lightning condition, the second level 'L2' may generally represent an even darker lightning condition, and the third level 'L3' may generally represent an almost completely dark condition. Similarly, the fourth level 'L4' may generally represent a brighter than normal lightning condition, the fifth level 'L5' may generally represent an even brighter lightning condition (such as, some sunlight impinging on the liquid crystal display device 100), and the sixth level 'L6' may generally represent a very bright lightning condition (such as, direct sunlight impinging on the liquid crystal display device 100). It may be contemplated that although six specific levels of intensity signal 'I' have been defined herein, more or less number of levels may be utilized without any limitations.

In one example, in case of the intensity signal 'I' indicative of the intensity of the external light is at the zero level 'L0', i.e. brighter than the first level 'L1' but darker than the fourth level 'L4', the controller 106 is configured to regulate all of the plurality of transmittance pixels 110 and all of the plurality of reflective pixels 112 in the active state. As it may be seen from FIG. 2, all of the transmittance pixels 110 and the reflective pixels 112, in the liquid crystal display panel 102, have been shown to be in the active state at the zero level 'L0'. It may be understood that this is being done since the intensity signal 'I' at the zero level 'L0' indicates a normal lightning condition, and thus it may be required to utilize both the backlight as well as the external light to produce an image in the liquid crystal display device 100. For instance, in case of the intensity signal 'I' being at the zero level 'L0', the controller 106 regulates the pixels 110, 112 such that the exemplary liquid crystal display panel 102 (as discussed above) may have all fifty (50) number of the transmittance pixels 110 as well as all fifty (50) number of the reflective pixels 112 in the active state, in the liquid crystal display panel 102.

Further, in one example, in case of the intensity signal 'I' indicative of the intensity of external light being at the first level 'L1', the controller 106 is configured to regulate to increase the number of the plurality of reflective pixels 112 in the inactive state as compared to the zero level 'L0'. In such case, the controller is configured to regulate a first number of the plurality of reflective pixels 112 in the inactive state. Further, in case of the intensity signal 'I' indicative of the intensity of external light being at the second level 'L2', the controller 106 is configured to regulate to increase the number of the plurality of reflective pixels 112 in the inactive state as compared to the first level 'L1'. In such case, the controller is configured to regulate a second number of the plurality of reflective pixels 112 in the inactive state. As it may be seen from FIG. 2, the second number of the reflective pixels 112 in the inactive state at the second level 'L1' is larger as compared to the first number of the reflective pixels 112 in the inactive state at the first level 'L1' (which, in turn, is higher than the number of the reflective pixels 112 in the inactive state at the zero level 'L0'). It may be understood that this is being done since the intensity signal 'I' moving towards the second level 'L2' from the zero level 'L0' indicates an increasingly darker condition, and thus there might not be enough external light for the reflective pixels 112 in the active state to reflect back and contribute towards producing an image in the liquid crystal display device 100. Consequently, it may be judicious for the controller 106 to regulate to increase the number of the reflective pixels 112 in the inactive state and minimize the possible electrical energy consumption thereof, and thus reduce the overall energy consumption of the liquid crystal display device 100. Furthermore, in such example, the controller 106 is configured to regulate all of the transmittance pixels 110 in the active state so as to utilize all of the available backlight for producing an image in the liquid crystal display device 100, and in a manner compensate for any loss of brightness in the liquid crystal display device 100 due to regulating of the increased number of the reflective pixels 112 in the inactive state. For instance, in case of the intensity signal 'I' being at the second level 'L2', the controller 106 regulates the pixels 110, 112 such that the exemplary liquid crystal display panel 102 (as discussed above) may have all fifty (50) number of the transmittance pixels 110 in the active state, about twenty-five (25) number of the reflective pixels 112 in the active state and the other twenty-five (25) number of the reflective pixels 112 in the inactive state.

Further, in one example, in case of the intensity signal 'I' indicative of the intensity of external light being equal to or darker than the third level 'L3', the controller 106 is configured to regulate all of the reflective pixels 112 in the inactive state. As it may be seen from FIG. 2, all of the reflective pixels 112 are in the inactive state at the third level 'L3'. It may be understood that this is being done since the intensity signal 'I' at the third level 'L3' or below thereof generally indicates a completely dark condition, and thus there might be no external light for the reflective pixels 112 in the active state to reflect back and contribute towards producing an image in the liquid crystal display device 100. Consequently, it may be judicious for the controller 106 to regulate all of the reflective pixels 112 in the inactive state and diminish the possible electrical energy consumption thereof, and thus reduce the overall energy consumption of the liquid crystal display device 100. Furthermore, in such example, the controller 106 is configured to regulate all of the transmittance pixels 110 in the active state so as to utilize all of the available backlight for producing an image in the liquid crystal display device 100. For instance, in case of the intensity signal 'I' being at the third level 'L3', the controller 106 regulates the pixels 110, 112 such that the exemplary liquid crystal display panel 102 (as discussed above) may have all fifty (50) number of the transmittance pixels 110 in the active state and all fifty (50) number of the reflective pixels 112 in the inactive state. It may be understood that in such case, the liquid crystal display panel 102 may operate at half pixel resolution (i.e., becomes half definition) of the maximum possible pixel resolution (i.e. maximum definition).

Further, in one example, in case of the intensity signal 'I' indicative of the intensity of external light being at the fourth level 'L4', the controller 106 is configured to regulate to increase the number of the plurality of transmittance pixels 110 in the inactive state as compared to the zero level 'L0'. In such case, the controller is configured to regulate a fourth number of the plurality of transmittance pixels 110 in the inactive state. Further, in case of the intensity signal 'I' indicative of the intensity of external light being at the fifth level 'L5', the controller 106 is configured to regulate to increase the number of the plurality of transmittance pixels 110 in the inactive state as compared to the fourth level 'L4'. In such case, the controller is configured to regulate a fifth number of the plurality of reflective pixels 112 in the inactive state. As it may be seen from FIG. 2, the fifth number of the transmittance pixels 110 in the inactive state at the fifth level 'L5' is larger as compared to the fourth number of the transmittance pixels 110 in the inactive state at the fourth level 'L4'. It may be understood that this is being done since the intensity signal 'I' moving towards the fifth level 'L5' from the zero level 'L0' indicates an increasingly brighter condition, and thus there might be sufficient external light for the reflective pixels 112 in the active state to reflect back and produce an image in the liquid crystal display device 100, without need of much of the backlight. Consequently, it may be judicious for the controller 106 to regulate to increase the number of the transmittance pixels 110 in the inactive state to reduce the dependence on the backlight and may also possibly even reduce the electrical energy supplied to the light source 104 to reduce the intensity of the backlight (which is not so much needed herein), and thus reduce the overall energy consumption of the liquid crystal display device 100. Furthermore, in such example, the controller 106 is configured to regulate all of the reflective pixels 112 in the active state so as to reflect all of the received external light for producing an image in the liquid crystal display device 100. For instance, in case of the intensity signal 'I' being at the fifth level 'L5', the controller 106 regulates the pixels 110, 112 such that the exemplary liquid crystal display panel 102 (as discussed above) may have all fifty (50) number of the reflective pixels 112 in the active state, about twenty-five (25) number of the transmittance pixels 110 in the active state and the other twenty-five (25) number of the transmittance pixels 110 in the inactive state.

Further, in one example, in case of the intensity signal 'I' indicative of the intensity of external light being equal to or brighter than the sixth level 'L6', the controller 106 is configured to regulate all of the transmittance pixels 110 in the inactive state. As it may be seen from FIG. 2, all of the transmittance pixels 110 are in the inactive state at the sixth level 'L6'. It may be understood that this is being done since the intensity signal 'I' at the sixth level 'L6' or upwards thereof generally indicates a very bright condition, and thus there might be sufficient external light for the reflective pixels 112 in the active state to reflect back and produce an image in the liquid crystal display device 100, without need of the backlight. Consequently, it may be judicious for the controller 106 to regulate all of the transmittance pixels 110 in the inactive state and may also reduce the electrical energy supplied to the light source 104 to reduce the intensity of the backlight (which is not needed herein), and thus reduce the overall energy consumption of the liquid crystal display device 100. In one embodiment, in case of the intensity signal 'I' indicative of the intensity of the external light being equal to or brighter than the sixth level 'L6', the controller 106 switches off the light source 104. This may significantly reduce the overall energy consumption of the liquid crystal display device 100. Furthermore, in such example, the controller 106 is configured to regulate all of the reflective pixels 112 in the active state so as to reflect all of the received external light for producing an image in the liquid crystal display device 100. For instance, in case of the intensity signal 'I' being at the sixth level 'L6', the controller 106 regulates the pixels 110, 112 such that the exemplary liquid crystal display panel 102 (as discussed above) may have all fifty (50) number of the reflective pixels 112 in the active state and all fifty (50) number of the transmittance pixels 110 in the inactive state. It may be understood that in such case, the liquid crystal display panel 102 may operate at half pixel resolution (i.e., becomes half definition) of the maximum possible pixel resolution (i.e. maximum definition).

Figure 3A:
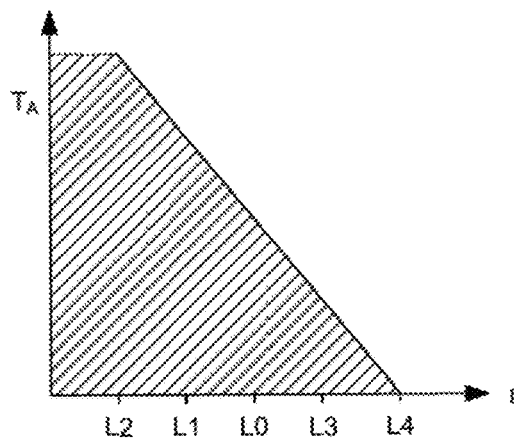
FIGS. 3A-3D illustrate various graphs depicting changes in the states of transmittance pixels and reflective pixels in the liquid crystal display panel of the liquid crystal display device based on the intensity signal, in accordance with one example embodiment of the present disclosure.
Figure 3B:
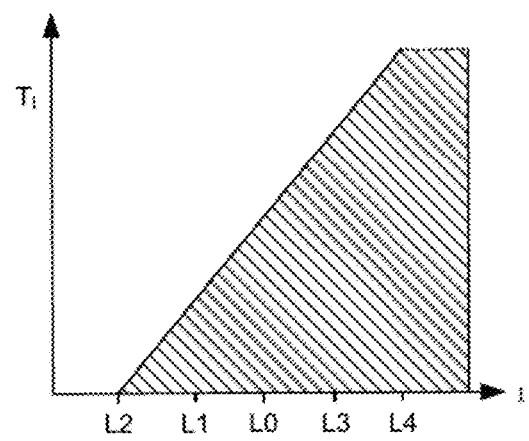
Figure 3C:
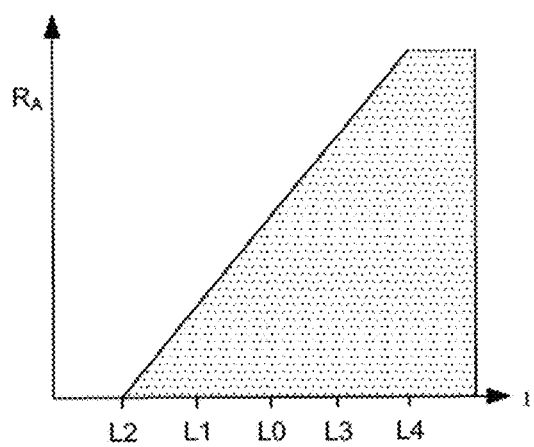
Figure 3D:
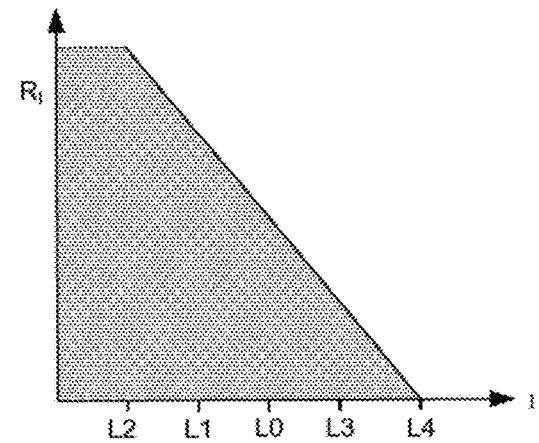

FIGS. 3A-3D illustrate various graphs depicting a change in the states of the transmittance pixels 110 and the reflective pixels 112 as the intensity signal 'I' varies between the third level 'L3' and the sixth level 'L6'. FIG. 3A depicts the change in the number of the transmittance pixels 110 in the active state (represented on vertical axis as '$T_A$') with the change in the intensity signal 'I'. As illustrated in FIG. 3A, first the number of transmittance pixels 110 in the active state '$T_A$' are close to maximum; and, as the intensity signal 'I' crosses the zero level 'L0', the number of the transmittance pixels 110 in the active state '$T_A$' starts decreasing approaching to zero at the sixth level 'L6'. FIG. 3B depicts the change in the number of the transmittance pixels 110 in the inactive state (represented on vertical axis as '$T_I$') with the change in the intensity signal 'I'. As illustrated in FIG. 3B, first the number of the transmittance pixels 110 in the inactive state '$T_I$' are close to zero; and, as the intensity signal 'I' crosses the zero level 'L0', the number of the transmittance pixels 110 in the inactive state '$T_I$' starts increasing approaching to maximum at the sixth level 'L6'. FIG. 3C depicts the change in the number of the reflective pixels 112 in the active state (represented on vertical axis as '$R_A$') with the change in the intensity signal 'I'. As illustrated in FIG. 3C, as the intensity signal 'I' increases, the number of the reflective pixels 112 in the active state '$R_A$' increases till the number of reflective pixels 112 in the active state '$R_A$' approaches to maximum close to the zero level 'L0'. FIG. 3D depicts the change in the number of the reflective pixels 112 in the inactive state (represented on vertical axis as '$R_I$') with the change in the intensity signal 'I'. As illustrated in FIG. 3D, as the intensity signal 'I' increases, the number of the reflective pixels 112 in the inactive state '$R_I$' decreases till the number of the reflective pixels 112 in the inactive state '$R_I$' approaches zero close to the zero level 'L0'. Although shown as being linear, the slope of the lines $T_A/I$, $T_I/I$, $R_A/I$, and $R_I/I$ can also be exponential, logarithmic, etc.

Figure 4:
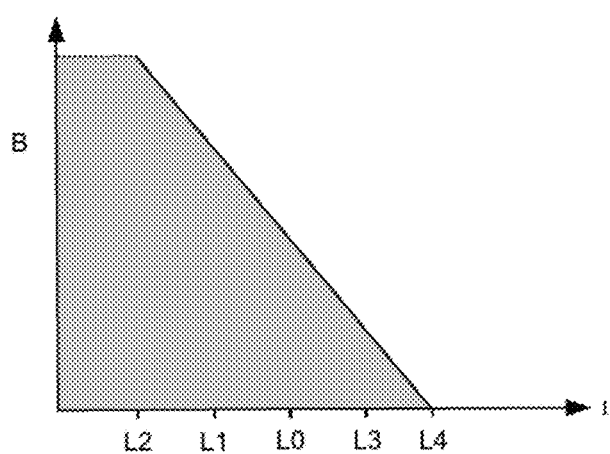
FIG. 4 illustrates a graph depicting a change in intensity of backlight based on the intensity signal in the liquid crystal display device, in accordance with one example embodiment of the present disclosure.

FIGS. 4A-4B illustrate graphs depicting a change in the intensity of the backlight (represented on vertical axis as 'B') as required for producing an image in the liquid crystal display device 100, as the intensity signal 'I' varies between the third level 'L3' and the sixth level 'L6'. In one embodiment, as illustrated in FIG. 4A, as the intensity signal 'I' increases, the controller 106 may decrease the intensity of the backlight 'B' by reducing the energy supplied to the light source 104. In particular, until the intensity signal 'I' reaches the zero level 'L0', the intensity of the backlight 'B' is kept to maximum, and thereafter the intensity of the backlight 'B' is reduced by decreasing the power supplied to the light source 104 until the light source 104 is completely switched off. Although shown as a linear decrease, the decrease may also be exponential, or logarithmic, etc. It may be understood that the intensity of the backlight 'B' corresponds to the number of the transmittance pixels 110 in the active state '$T_A$' (as illustrated in FIG. 3A). In an alternate embodiment, as illustrated in FIG. 4B, the intensity of the backlight 'B' is constantly kept to maximum irrespective of the state of the pixels 110, 112 in the liquid crystal display panel 102 as far as the intensity signal T does not reach the six level. However, as the intensity signal T crosses the sixth level 16: the light source 104 is completely switched off. It may maintain a quality of image displayed in the transmittance pixels 110 in the active state 'T$_A$'.

Figure 5:
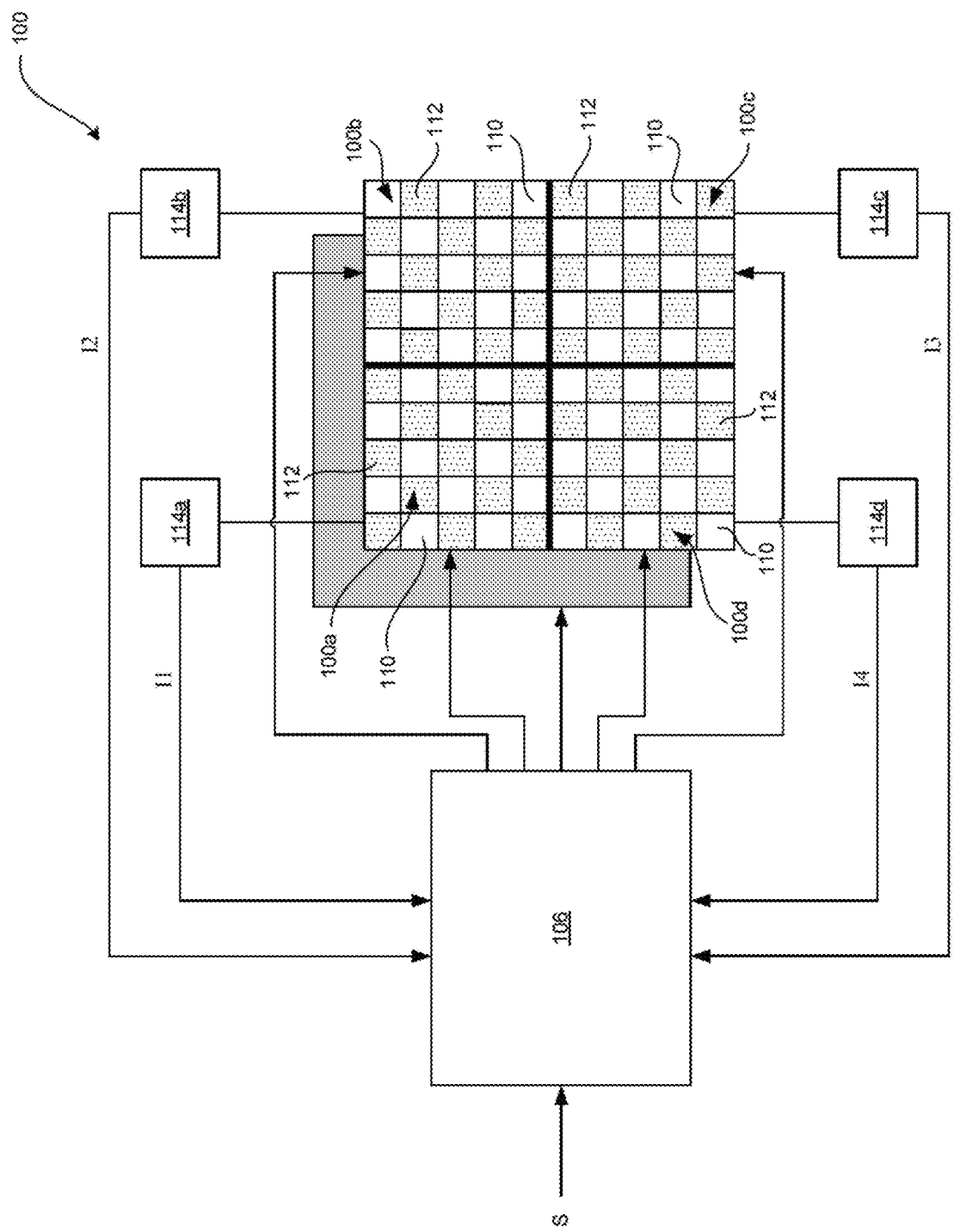
FIG. 5 illustrates a schematic representation of the liquid crystal display device, in accordance with another embodiment of the present disclosure.

In one embodiment, the liquid crystal display device 100 may be divided into two or more sections; and two or more light sensors 114 may be provided in the liquid crystal display device 100, such that each of the light sensor 114 is associated with one of the sections of the liquid crystal display device 100. For example, as illustrated in FIG. 5, the liquid crystal display device 100, or specifically the liquid crystal display panel 102 therein, may be divided into four arbitrary sections, namely a first section 100a, a second section 100b, a third section 100c, and a fourth section 100d. It may be understood that alternatively the liquid crystal display device 100 may be formed of two or more liquid crystal display devices, and each of such two or more liquid crystal display devices may act as one of the sections of the liquid crystal display device 100. Further, the liquid crystal display device 100 may include four light sensors 114, namely a first light sensor 114a, a second light sensor 114b, a third light sensor 114c, and a fourth light sensor 114d associated with the first section 100a, the second section 100b, the third section 100c, and the fourth section 100d, respectively. Each of the light sensor 114a, 114b, 114c, and 114d is configured to measure the intensity of external light impinging on the associated section 100a, 100b, 100c, and 100d, respectively. Further, each of the light sensor 114a, 114b, 114c, and 114d is configured to generate a section intensity signal, namely a first section intensity signal 'L1' for the first section 100a, a second section intensity signal 'L2' for the second section 100b, a third section intensity signal 'L3' for the third section 100c, and a fourth section intensity signal 'L4' for the fourth section 100a. Furthermore, the controller 106 is configured to regulate the number of the plurality of transmittance pixels 110 either in the active state or in the inactive state in the sections 100a, 100b, 100c, and 100d based on the section intensity signals I1, I2, I3, and I4 corresponding thereto, and also to regulate the number of the plurality of reflective pixels 112 either in the active state or in the inactive state in the sections 100a, 100b, 100c, and 100d based on the section intensity signals I1, I2, I3, and I4 corresponding thereto. The methods and requirements for regulating the transmittance pixels 110 and the reflective pixels 112 in each of the sections 100a, 100b, 100c, and 100d is substantially the same as that for the undivided liquid crystal display device 100, as discussed in reference to FIGS. 1-4. In some examples, the light source 104 may also be divided into similar number of corresponding sections 100a, 100b, 100c, and 100d as the display panel 102, or each section 100a, 100b, 100c, and 100d of the display panel 102 may have a discrete light source 104 thereof; and the light source 104 corresponding to each section 100a, 100b, 100c, and 100d of the display panel 102 may be regulated by the controller 106 in a similar manner as discussed in reference to FIGS. 1-4.

In one embodiment, the controller 106 is configured to also allow for manually regulating the number of the plurality of transmittance pixels 110 and the number of the plurality of reflective pixels 112 either in the active state or in the inactive state. Such embodiment may be utilized when there is no light sensor (such as, the light sensor 114) provided with the liquid crystal display device 100. For this purpose, the controller 106 may include a manual switch dial or buttons (not shown) or the like which a user may operate to achieve/reproduce the same effect on the liquid crystal display device 100 which takes place with the change in the intensity of the external light impinging thereon. For example, a remote control (not shown) or the like may be provided for the liquid crystal display device 100 in order to allow a user to manually select one of preset modes of the liquid crystal display device 100. These modes are pre-programmed for producing superior image quality in the liquid crystal display device 100 with respect to different lightning conditions. For instance, if the user feel it is a completely dark environment, the user may select a corresponding "Dark Mode" on the remote control, and the controller 106 may be configured to regulate all of the transmittance pixels 110 in the active state and all of the reflective pixels 110 in the inactive state, in the display panel 102. Conversely, if the user feel it is a very bright environment, the user may select a corresponding "Bright Mode" on the remote control, and the controller 106 may be configured to regulate all of the transmittance pixels 110 in the inactive state and all of the reflective pixels 110 in the active state, in the display panel 102.

Figure 6:
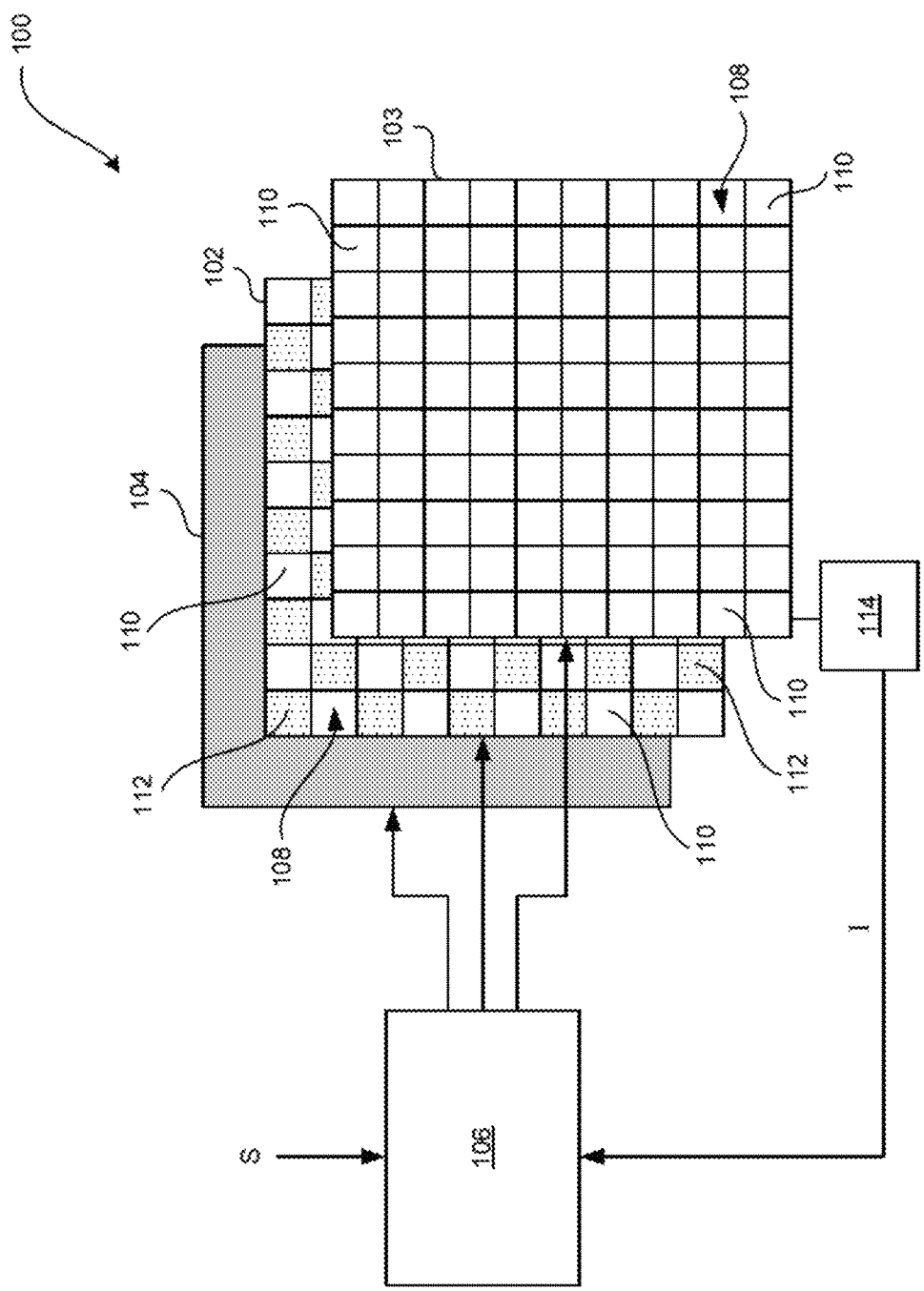
FIG. 6 illustrates a schematic representation of the liquid crystal display device, in accordance with yet another embodiment of the present disclosure.

In one embodiment, as illustrated in FIG. 6, the liquid crystal display device 100 has a double-panel configuration and includes an additional liquid crystal display panel 103 therefor. In the liquid crystal display device 100, the additional liquid crystal display panel 103 is stacked on the liquid crystal display panel 102 such that the liquid crystal display panel 102 is disposed between the light source 104 and the additional liquid crystal display panel 103. Herein, sometimes, the liquid crystal display panel 102 has been interchangeably referred to as "the first liquid crystal display panel 102," and the additional liquid crystal display panel 103 has been interchangeably referred to as "the second liquid crystal display panel 103" without any limitations. The additional liquid crystal display panel 103 only includes the transmittance pixels 110 (and not any reflective pixels 112), like a regular panel of conventional liquid crystal display devices. The controller 106 is configured to regulate each of a plurality of transmittance pixels 110 in the additional liquid crystal display panel 103 in the active state to transmit the backlight from the light source 104 through the first liquid crystal display panel 102 and/or reflected external light from the reflective pixels 112 of the first liquid crystal display panel 102 based on the image signal 'S'. Further, the controller 106 is configured to regulate the transmittance pixels 110 and the reflective pixels 112 either in the active state or in the inactive state based on the intensity signal 'I' for the first liquid crystal display panel 102 (in the double-panel configuration) in a similar manner as discussed for the liquid crystal display panel 102 with reference to FIGS. 1-5.

Different from the previous embodiment of the single-panel configuration, the double-panel configuration utilizes the additional liquid crystal display panel 103 in which the plurality of transmittance pixels 110 are always regulated in the active state (no inactive state). Thus, even in dark environments (such as, in an indoor club or the like) or bright environments (such as, outdoors on a sunny day), a definition of the liquid crystal display device 100 is constant (i.e., the liquid crystal display device 100 always operate at maximum definition). In this embodiment, there are two ways of regulating the transmittance pixels 110 and the reflective pixels 112 of the first liquid crystal display panel 102 in the active state, i.e., respective or irrespective of the image signal 'S'. When the first liquid crystal display panel 102 is operated respective of the image signal 'S', the first liquid crystal display panel 102 (in the double-panel configuration) is operated in a similar manner as discussed for the liquid crystal display panel 102 with reference to FIGS. 1-5. That is, the first liquid crystal display panel 102 displays an image based on the image signal 'S' although it might display half-definition of maximum possible resolution thereof in very dark or bright atmosphere. However, the first liquid crystal display panel 102 contributes to a good quality of image, for example, by generating a high contrast-ratio image. On the other hand, in case the first liquid crystal display panel 102 is operated irrespective of the image signal 'S', the first liquid crystal display panel 102 (in the double-panel configuration) is driven in a different manner as discussed for the liquid crystal display panel 102 in the previous embodiment of FIG. 6. In this case, the controller 106 is configured to regulate the transmittance pixels 110 and the reflective pixels 112 in the active state for the first liquid crystal display panel 102 by driving the transmittance pixels 110 and the reflective pixels 112 in full gray scale. Although the first liquid crystal display panel 102 may not contribute to a good quality of image, but it becomes easier to control the first liquid crystal display panel 102 and emits proper backlight to the additional liquid crystal display panel 103 by mixing the active state of transmittance pixels 110 and the reflective pixels 112. It may also be appreciated that since a liquid crystal display device having a double-panel configuration may require more light as compared to a single-panel configuration to produce an image (since the light has to travel through two display panels with their various layers), the present liquid crystal display device 100 with the reflective pixels 112 may suitably provide the needed extra light (i.e. external light in addition to the backlight) for generating a proper image therein.

The liquid crystal display device 100 of the present disclosure adapts itself to varying lightning conditions. The liquid crystal display device 100 enables an ability to regulate the transmittance pixels 110 and the reflective pixels 112 either in the active state or in the inactive state based on the prevalent lightning condition. For example, in dark environments (such as, in an indoor club or the like), the liquid crystal display device 100 primarily use the transmittance pixels 110 to generate the image using the backlight from the light source 104. Conversely, in bright environments (such as, outdoors on a sunny day), the liquid crystal display device 100 primarily use the reflective pixels 112 to generate the image using the reflected external light. This ensures that the liquid crystal display device 100 always able to provide enough brightness for proper viewing of the generated image therein, and thus provides the advantage of generating consistent and good quality image in varying lightning conditions. Further, by regulating the pixels 110, 112 when not required, the liquid crystal display device 100 may reduce its overall power consumption. Moreover, in bright environments, when the liquid crystal display device 100 is only using the reflected external light from the reflective pixels 112, the liquid crystal display device 100 may switch off the light source 104 (as the backlight therefrom is not needed), and thus may provide significant energy savings. Due to the use of the reflected external light, the liquid crystal display device 100 may be readable under direct sunlight, and thus may find applications in handheld devices (e.g., mobile phones, audio and video players, gaming systems, and so forth). Also, by possibly reducing the constant use of the light source 104, the liquid crystal display device 100 may also improve the battery life of such handheld devices. The liquid crystal display device 100 of the present disclosure is particularly suitable for digital signage, such as, for example, large digital displays used for advertisements in outdoors.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A liquid crystal display device comprising:
   a liquid crystal display panel;
   a light source for providing backlight for the liquid crystal display panel; and
   a controller for receiving an external input image signal and controlling the liquid crystal display panel, wherein:
   the liquid crystal display panel comprises a plurality of transmittance pixels and a plurality of reflective pixels formed thereon,
   the controller is configured to control each of the plurality of transmittance pixels and each of the plurality of reflective pixels to be either in an active state or in an inactive state independent to each other,
   the controller is configured to control each of the plurality of transmittance pixels in the active state to transmit the backlight from the light source based on the external input image signal, and is further configured to control each of the plurality of transmittance pixels in the inactive state to block the backlight from the light source irrespective of the external input image signal, and is further configured to control each of the plurality of reflective pixels in the active state to reflect external light based on the external input image signal, and is further configured to control each of the plurality of reflective pixels in the inactive state to inhibit reflection of external light irrespective of the external input image signal, wherein
   the liquid crystal display further comprises: a light sensor configured to measure an intensity of external light impinging on the liquid crystal display device and generate an intensity signal indicative of the intensity of external light,
   the controller is configured to regulate a number of the plurality of transmittance pixels either in the active state or in the inactive state based on the intensity signal, and to regulate a number of the plurality of reflective pixels either in the active state or in the inactive state based on the intensity signal, and
   the controller is configured to regulate a first number of the plurality of reflective pixels to be in an inactive state when the intensity signal is at a first level; and wherein the controller is configured to regulate a second number of the plurality of reflective pixels to be in an inactive state when the intensity signal is at a second level, wherein the second level is darker than the first level and the second number of the plurality of reflective pixels is larger than the first number of the plurality of reflective pixels.

2. The liquid crystal display device according to claim 1, wherein the controller is configured to regulate all of the plurality of reflective pixels to be in the inactive state when the intensity signal is darker than a third level, the third level being darker than the second level.

3. A liquid crystal display device comprising:
   a liquid crystal display panel;

a light source for providing backlight for the liquid crystal display panel; and a controller for receiving an external input image signal and controlling the liquid crystal display panel, wherein:

the liquid crystal display panel comprises a plurality of transmittance pixels and a plurality of reflective pixels formed thereon, the controller is configured to control each of the plurality of transmittance pixels and each of the plurality of reflective pixels to be either in an active state or in an inactive state independent to each other, the controller is configured to control each of the plurality of transmittance pixels in the active state to transmit the backlight from the light source based on the external input image signal, and is further configured to control each of the plurality of transmittance pixels in the inactive state to block the backlight from the light source irrespective of the external input image signal, and is further configured to control each of the plurality of reflective pixels in the active state to reflect external light based on the external input image signal, and is further configured to control each of the plurality of reflective pixels in the inactive state to inhibit reflection of external light irrespective of the external input image signal, wherein the liquid crystal display further comprises: a light sensor configured to measure an intensity of external light impinging on the liquid crystal display device and generate an intensity signal indicative of the intensity of external light, the controller is configured to regulate a number of the plurality of transmittance pixels either in the active state or in the inactive state based on the intensity signal, and to regulate a number of the plurality of reflective pixels either in the active state or in the inactive state based on the intensity signal, and the controller is configured to regulate a fourth number of the plurality of transmittance pixels to be in the inactive state when the intensity signal is at a fourth level, and the controller is configured to regulate a fifth number of the plurality of transmittance pixels to be in the inactive state when the intensity signal is at a fifth level, the fifth level being brighter than the fourth level, and the fifth number of the plurality of transmittance pixels is larger than the fourth number of the plurality of transmittance pixels.

4. The liquid crystal display device according to claim 3, wherein the controller is configured to regulate all of the plurality of transmittance pixels to be in the inactive state when the intensity signal is brighter than a sixth level, the sixth level being brighter than the fifth level.

5. The liquid crystal display device according to claim 4, wherein the light source is switched off when the intensity signal is brighter than the sixth level.

6. The liquid crystal display device according to claim 1, wherein the controller is configured to regulate all of the plurality of transmittance pixels and all of the plurality of reflective pixels in the active state when the intensity signal is brighter than the first level and darker than a fourth level.

7. The liquid crystal display device according to claim 1, wherein a number of the plurality of transmittance pixels is equal to number of the plurality of reflective pixels.

8. The liquid crystal display device according to claim 1 further comprises two or more light sensors, each of the two or more light sensors is associated with a unique section of the liquid crystal display device and is configured to measure an intensity of external light impinging on the unique section and generate a section intensity signal indicative of the intensity of external light.

9. The liquid crystal display device according to claim 8, wherein the controller is configured to regulate a number of the plurality of transmittance pixels either in the active state or in the inactive state in the one or more sections based on the section intensity signals corresponding thereto, and to regulate a number of the plurality of reflective pixels either in the active state or in the inactive state in the one or more sections based on the section intensity signals corresponding thereto.

10. The liquid crystal display device according to claim 1, wherein the controller is configured to allow for manually regulating the number of the plurality of transmittance pixels and the number of the plurality of reflective pixels either in the active state or in the inactive state.

11. The liquid crystal display device according to claim 1 further comprises an additional liquid crystal display panel stacked on the liquid crystal display panel such that the liquid crystal display panel is between the light source and the additional liquid crystal display panel, wherein each pixel formed in the additional liquid crystal display panel is a transmittance pixel.

12. A liquid crystal display device comprising:

a plurality of liquid crystal display panels including a first liquid crystal display panel and a second liquid crystal display panel;

a light source for providing backlight for the plurality of liquid crystal display panels; and a controller for receiving an external input image signal and controlling the plurality of liquid crystal display panels, wherein:

the first liquid crystal display panel is disposed between the second liquid crystal display panel and the light source, the first liquid crystal display panel comprises a plurality of transmittance pixels and a plurality of reflective pixels formed thereon, the controller is configured to control the plurality of transmittance pixels and the plurality of reflective pixels to be either in an active state or in an inactive state independent to each other, the controller is configured to control each of the plurality of transmittance pixels in the active state to transmit the backlight from the light source irrespective of the external input image signal, and is further configured to control each of the plurality of transmittance pixels in the inactive state to block the backlight from the light source irrespective of the external input image signal, and is further configured to control each of the plurality of reflective pixels in the active state to reflect external light irrespective of the external input image signal, and is further configured to control each of the plurality of reflective pixels in the inactive state to inhibit reflection of external light irrespective of the external input image signal, wherein the liquid crystal display device further comprises at least one light sensor configured to measure an intensity of external light impinging on the liquid crystal display device and generate an intensity signal indicative of the intensity of external light, the controller is configured to regulate a number of the plurality of transmittance pixels of the first liquid crystal display panel either in the active state or in the inactive state based on the intensity signal, and to regulate a number of the plurality of reflective pixels of the first liquid crystal display panel either in the active state or in the inactive state based on the intensity signal, and the controller is configured to regulate a first number of the plurality of reflective pixels in the inactive state when the intensity signal is at a first level, and the controller is configured to regulate a second number of the plurality of reflective pixels in the inactive state when the intensity signal is at a second level, the second level being darker than the first level, and the second number of the plurality of reflective pixels is larger than the first number of the plurality of reflective pixels.

13. The liquid crystal display device according to claim 12, wherein each pixel formed in the second liquid crystal display panel is a transmittance pixel and the controller is configured to regulate each of a plurality of transmittance pixels in the second liquid crystal display panel in the active state to transmit the backlight from the light source based on the external input image signal.

* * * * *